US008381270B1

(12) United States Patent
Hsieh et al.

(10) Patent No.: US 8,381,270 B1
(45) Date of Patent: Feb. 19, 2013

(54) NETWORK CONFIGURATION AND AUTHORIZATION

(75) Inventors: Andrew Hsieh, Taipei (TW); Chinyue Chen, Xizhi (TW); Yung-chieh Lo, Taipei (TW)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,695

(22) Filed: Sep. 30, 2011

Related U.S. Application Data

(63) Continuation of application No. 13/232,644, filed on Sep. 14, 2011.

(51) Int. Cl.
*G06F 7/04* (2006.01)
(52) U.S. Cl. .......................................................... 726/4
(58) Field of Classification Search ........................ None
See application file for complete search history.

(56) References Cited

U.S. PATENT DOCUMENTS

| 7,748,035 | B2 * | 6/2010 | Nedeltchev et al. | 726/15 |
| 7,805,134 | B2 * | 9/2010 | Mirza-Baig | 455/418 |
| 7,809,012 | B2 | 10/2010 | Ruuska et al. | |
| 2009/0101716 | A1 * | 4/2009 | Mani et al. | 235/441 |
| 2009/0187759 | A1 * | 7/2009 | Marsico | 713/155 |
| 2010/0045441 | A1 * | 2/2010 | Hirsch et al. | 340/10.1 |
| 2010/0137024 | A1 | 6/2010 | Maguire | |
| 2010/0178866 | A1 | 7/2010 | Jalkanen | |
| 2010/0203831 | A1 | 8/2010 | Muth | |
| 2011/0070829 | A1 | 3/2011 | Griffin et al. | |
| 2011/0210831 | A1 | 9/2011 | Talty et al. | |
| 2011/0275316 | A1 | 11/2011 | Suumaki et al. | |
| 2011/0287718 | A1 | 11/2011 | Abel et al. | |
| 2011/0319016 | A1 | 12/2011 | Gormley et al. | |

FOREIGN PATENT DOCUMENTS
WO 2009105115 A2 8/2009

OTHER PUBLICATIONS

NFC Forum, "Generic Control Record Type Definition", Technical Specification, NFC Forum, GC-RTD 1.0, NFCForum-TS-Generic-ControlRTD_1.0, Mar. 7, 2008, 24 pp.
Technabob, "Nokia Play 360 NFC Portable Speaker: Bump to Play", http://technabob.com/blog/2011/22/nokia-play-360-nfc-portable-speaker/, Jun. 22, 2011, 9 pp.
"Get connected," Bump Technologies, Inc. 2011 [online]. Retrieved from the Internet: <http://bu.mp/> (1 pg.).
U.S. Appl. No. 13/232,689, by Richard Carl Gossweiler III, filed Sep. 14, 2011.
U.S. Appl. No. 13/251,015, by Richard Carl Gossweiler III, filed Sep. 30, 2011.
"Wi-Fi Protected Setup," Wikipedia [online]. First accessed on Feb. 14, 2011. Retrieved from the Internet: <http://en.wikipedia.org/wiki/Wi-Fi_Protected_Setup> (3 pgs.).

(Continued)

*Primary Examiner* — Kaveh Abrishamkar
(74) *Attorney, Agent, or Firm* — Shumaker & Sieffert, P.A.

(57) ABSTRACT

Various aspects of this disclosure are directed to receiving, by a first computing device, one or more communications from a second device. The one or more communications may be transmitted using a short range wireless communication protocol. The one or more communications may include network configuration information usable to connect the first computing device to a first network and network authentication information. The first computing device may configure the first computing device to connect to the first network using the network configuration information. The first computing device may automatically connect to the first network by at least submitting, using a hypertext transfer protocol (HTTP) authentication mechanism, the authentication information to a third computing device that manages access to a second network accessible using the first network.

18 Claims, 4 Drawing Sheets

OTHER PUBLICATIONS

"Near Field Communication," ECMA International [online]. First accessed on Feb. 14, 2011. Retrieved from the Internet: <http://www.ecma-international.org/activities/Communications/tc32-tg19-2005-012.pdf> (12 pgs.).

"NFC Near Field Communication," Radio-Electronics.com [online]. First accessed on Feb. 14, 2011. Retrieved from the Internet: <http://www.radio-electronics.com/info/wirelessinfc/near-field-communications-tutorial.php> (4 pgs.).

"Frequently Asked Questions: Wi-Fi Protected Setup," Wi-Fi Alliance, 2006 [online]. First accessed on Feb. 14, 2011. Retrieved from the Internet: <http://www.wi-fi.org/files/WFA%20Wi-Fi%20Protected%20Setup%20FAQ.pdf> (4 pgs.)

"Near Field Communication," Wikipedia [online]. First accessed on Feb. 14, 2011. Retrieved from the Internet: <http://en.wikipedia.org/wiki/Near_field_communication> (20 pgs.).

U.S. Appl. No. 13/232,644, by Andrew Hsieh, filed Sep. 14, 2011.

NFC Forum, "Generic Control Record Type Definition", Technical Specification, NFC Forum, GC-RTD 1.0, NFCForum-TS-Generic-ControlRTD_1.0, Mar. 7, 2008, 24 pp.

Technabob, "Nokia Play 360 Nfc Portable Speaker: Bump to Play", http://technabob.com/blog/2011/06/22/nokia-play-360-nfc-portable-speaker/, Jun. 22, 2011, 9 pp.

"Frequently Asked Questions," Bump Technologies, Inc. 2011 [online]. Retrieved from the Internet: <http://bu.mp/faq> (4 pgs.).

* cited by examiner

ND AUTHORIZATION

This application is a continuation of U.S. application Ser. No. 13/232,644, filed Sep. 14, 2011, the entire contents of which is incorporated herein by reference.

TECHNICAL FIELD

This disclosure relates to computing devices, and more particularly to computing devices using short range wireless communications.

BACKGROUND

Computing devices, such as cellular telephones and laptop computers, may be configured to connect to a local area network, such as a wireless local area network. The local area network may be used by the computing device to access a wide area network, such as the wide area network commonly referred to as the Internet. Access to the Internet may require authentication of the computing device by another device, such as a proxy server, that manages access to the Internet.

Conventionally, a user performs several steps in order to configure a computing device to connect to a wireless local area network (WLAN) and authenticate the device prior to being granted access to the Internet using the WLAN. For example, the user may enter a service set identifier (SSID) of a WLAN into a configuration window of the computing device to configure the device to connect to the WLAN. In addition, the user may typically open a web browser and enter authentication information using a hypertext transfer protocol (HTTP) authentication mechanism. After performing these steps, the user may then be granted access to the Internet using the WLAN.

SUMMARY

In one example, various aspects of this disclosure are directed to a method that includes receiving, by a first computing device, one or more communications from a second device. The one or more communications are transmitted using a short range wireless communication protocol. The one or more communications include network configuration information usable to connect the first computing device to a first network and network authentication information. The method further comprises configuring the first computing device to connect to a first network using the network configuration information, and automatically connecting the first computing device to the first network by at least submitting, by the first computing device using a hypertext transfer protocol (HTTP) authentication mechanism, the authentication information to a third computing device that manages access to a second network accessible using the first network.

In another example, various aspects of this disclosure are directed to a computer-readable storage medium comprising instructions that, if executed, cause one or more processors of a first computing device to perform operations that include receiving one or more communications from a second device. The one or more communications are transmitted using a short range wireless communication protocol. The one or more communications include network configuration information usable to connect the first computing device to a first network and network authentication information. The computer-readable storage medium further comprises instructions that, if executed, cause the one or more processors of the first computing device to perform operations that include configuring the first computing device to connect to the first network using the network configuration information, and automatically connecting the first computing device to the first network by at least submitting, using a hypertext transfer protocol (HTTP) authentication mechanism, the authentication information to a third computing device that manages access to a second network accessible using the first network.

In another example, various aspects of this disclosure are directed to a computing device that includes at least one processor, and an interface configured to receive one or more communications from a second device. The one or more communications are transmitted using a short range wireless communication protocol. The one or more communications include network configuration information usable to connect the computing device to a first network and network authentication information. The device further includes a network configuration module operable by the at least one processor to configure the computing device to automatically connect to the first network using the network configuration information by at least submitting, using a hypertext transfer protocol (HTTP) authentication mechanism, the authentication information to a third computing device that manages access to a second network accessible using the first network.

The details of one or more aspects of this disclosure are set forth in the accompanying drawings and the description below. Other features, objects, and advantages of the disclosure will be apparent from the description and drawings, and from the claims.

DETAILED DESCRIPTION

Figure 1:
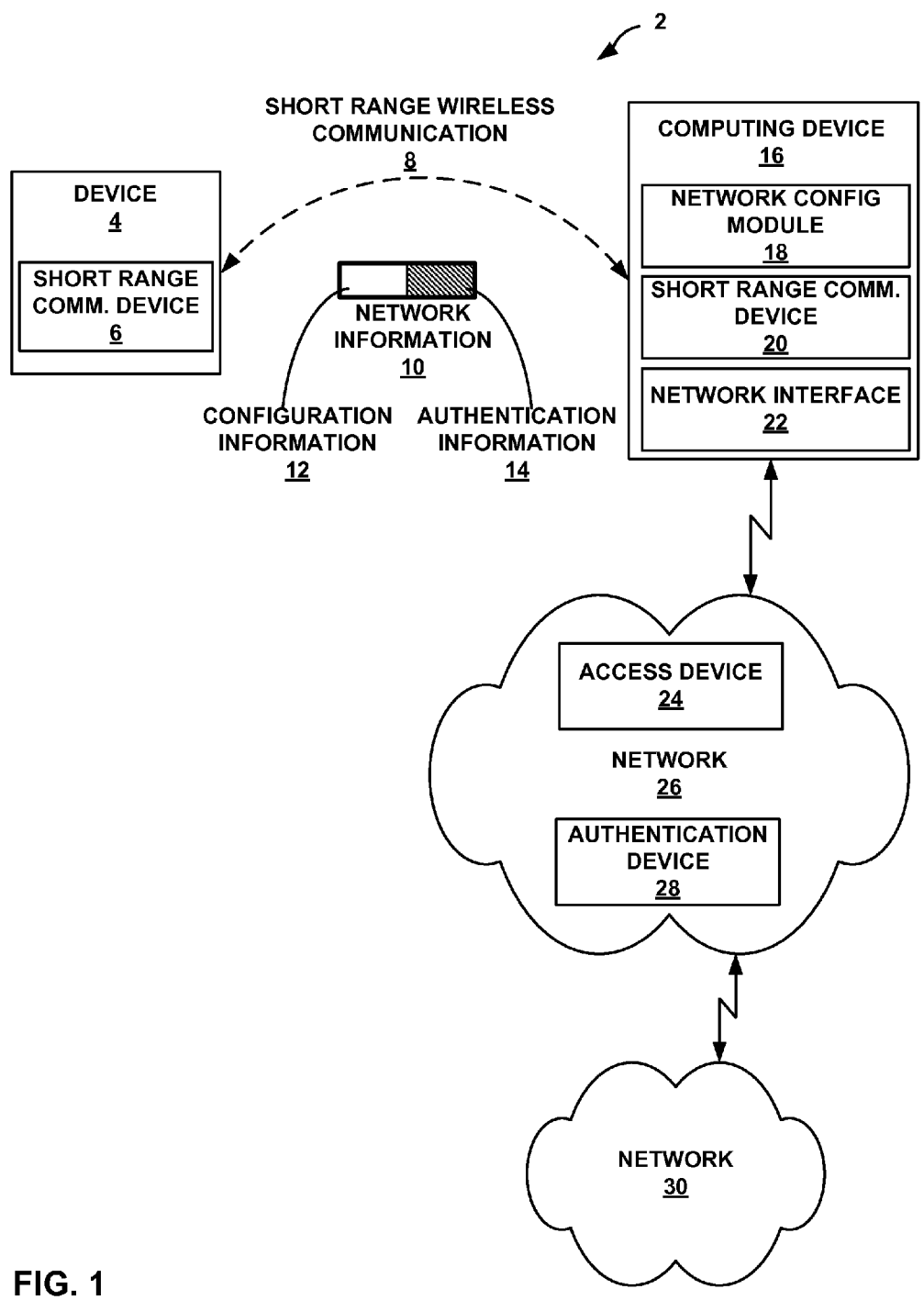
FIG. 1 is a block diagram illustrating an example communication system, in accordance with one or more aspects of this disclosure.

Computing devices, such as cellular telephones and laptop computers, may be configured to access the Internet using a local area network (LAN), such as a wireless local area network (WLAN). For instance, many WLANs are provided by establishments such as bookstores and coffee shops. These WLANs may act as wireless "hotspots," providing access to the Internet through the use of a router. The router may include a mechanism to manage access to the Internet or may be connected to a device, such as a proxy server, that manages access to the Internet. Prior to granting access to the Internet, the proxy server typically requires authentication information from a device in the form of a username and password via a hypertext transfer protocol (HTTP) authentication mechanism.

Conventionally, a user performs several steps in order to configure and authorize a device prior to being granted permission to utilize the wireless hotspot to access the Internet.

For instance, a user may enter a service set identifier (SSID) of the WLAN into a configuration window of the computing device, open a web browser, and enter authentication information via the HTTP authentication mechanism. After performing these steps, the user may be granted permission to utilize the wireless hotspot to access the Internet. However, this multistep process may require that the user know the SSID of the WLAN, the password of the WLAN in the case that the WLAN is an encrypted WLAN, the username and password for the HTTP authentication, and how to enter such information into the computing device.

In addition, many wireless hotspots are commercial (e.g., fee-based) hotspots. For instance, a store may provide access to the Internet for a period of time corresponding to an amount of money paid by a customer. To manage such time-limited access to the Internet, commercial hotspot providers may provide a customer with a dynamically generated user name or password that grants access to the hotspot for only the period of time corresponding to the amount of time purchased by the customer.

Therefore, to allow the customer access to the hotspot, the hotspot provider typically communicates to the customer the SSID for the WLAN, the password for the WLAN (in the case that the WLAN is encrypted), and the username and password for the HTTP authentication. The user typically manually enters the configuration information and authentication information into the user's computing device using the multistep process described above. Similarly, after purchasing additional network access time, a customer typically repeats the authentication process with a new username, password, or both.

Various aspects of this disclosure may provide one or more advantages. For instance, one or more aspects of this disclosure may simplify the process required for a computing device to gain authorized access to the Internet using a network. Instead of requiring a multistep procedure in which the user manually enters configuration and authentication information into the computing device, the techniques of this disclosure may enable the user to configure and authenticate the computing device on the network by using short range wireless communications, such as near field communication (NFC), to receive configuration and authentication information for the network. In some examples, the computing device may automatically connect to a LAN and authenticate the computing device on the WAN (e.g., the Internet) without requiring the user to perform additional steps.

For example, a user may enter a store that provides Internet access for a fee via a wireless network managed by the store. To gain access to the Internet, the user may pay a fee to a cashier or terminal. Upon receiving payment, the cashier or terminal may automatically program an NFC tag with the required configuration and authentication for the user to gain access to the Internet. The user may bring the computing device (e.g., a laptop computer) within the effective communication range of the properly programmed NFC tag (e.g., approximately four centimeters). The computing device may use active NFC hardware installed within the device to initiate one or more communications with the NFC tag and receive the configuration and authentication information programmed into the NFC tag. The computing device may then connect to the wireless network based on the configuration information received from the NFC tag. Once connected to the wireless network, the computing device may automatically open a web browser which is directed to a website that performs an HTTP authentication to authenticate the computing device prior to granting access to the Internet. The computing device may automatically populate the HTTP authentication form with the authentication information received from the NFC tag and submit the authentication information. Upon being successfully authenticated, the computing device may be granted access to the Internet using the wireless network provided by the store.

FIG. 1 is a block diagram illustrating an example communication system, in accordance with one or more aspects of this disclosure. As illustrated in FIG. 1, communication system 2 may include device 4, computing device 16, network 26, access device 24, authentication device 28, and network 30. Device 4 may include short range communication device 6. Computing device 16 may include network configuration module 18, short range communication device 20, and network interface 22. Using short range communication devices 6 and 20, device 4 and computing device 16 communicate using one or more short range wireless communications 8 (e.g., one or more communications using a short range wireless communication protocol). Examples of short range wireless communications 8 may include, but are not limited to, communications using a near field communication (NFC) mechanism, Bluetooth® communications, radio frequency identification (RFID) communications, and infrared data association (IrDA) communications. As such, examples of device 4 and computing device 16 may include devices that include short range communication devices (e.g., short range communication devices 6 and 20) capable of transmitting and receiving such short range wireless communications.

For instance, examples of short range communication devices 6 and 20 may include, but are not limited to, Bluetooth® transceivers, RFID tags, RFID readers, IrDA transceivers, passive NFC hardware such as passive NFC tags, and active NFC hardware. Examples of device 4 and computing device 16 may include, but are not limited to, portable or mobile devices such as cellular phones, laptop computers, personal digital assistants (PDAs), portable gaming devices, portable media players, and e-book readers. In addition, examples of device 4 may include devices dedicated to such short range communications (e.g., Bluetooth® transceivers), or devices including such dedicated devices (e.g., a cash register including passive NFC hardware, active NFC hardware, or active NFC hardware configured to emulate passive NFC hardware).

Computing device 16 and device 4 may be the same or different types of devices. For example, computing device 16 and device 4 may both be cellular phones. In another example, computing device 16 may be a cellular phone and device 4 may be a desktop computer.

Computing device 16 receives one or more short range wireless communications 8 from device 4. One or more short range wireless communications 8 may include one or more communications using a short range wireless communication protocol, such as NFC, RFID communications, communications using a Bluetooth® protocol, and the like. Short range wireless communications 8 include network information 10 that includes configuration information 12 and authentication information 14. In some examples, computing device 16 may receive both configuration information 12 and authentication information 14 in one short range wireless communication. In other examples, computing device 16 may receive one or more portions of network information 10 in multiple short range communications. For instance, computing device 12 may receive configuration information 12 in one short range wireless communication and may receive authentication information 14 in another short range wireless communication.

Computing device 16 may use network configuration module 18 to configure computing device 16 to connect to network 26. Network 26 may include wired or wireless networks or both. For example, network 26 may include a LAN, a WLAN, an enterprise network, or one or more other types of networks. Network configuration module 18 uses configuration information 12, received in one or more short range wireless communications 8, to configure computing device 16 to connect to network 26 through access device 24. Examples of access device 24 may include network routers, network switches, or one or more other devices capable of directing data within a network.

Computing device 16 uses network interface 22 to connect to network 26. Network interface 22 may be an interface configured to transmit data to and receive data from access device 24, authentication device 28, or one or more devices connected to network 26. Network interface 22 may support wireless or wired communication, and may include appropriate hardware and software to provide wireless or wired communication. For example, network interface 22 may include one or more of an antenna, modulators, demodulators, amplifiers, and other circuitry to effectuate communication between computing device 16, access device 24, authentication device 28, or one or more other devices.

Computing device 16 uses network configuration module 18 to configure computing device 16 for authentication by authentication device 28. For example, authentication device 28 may include a server, such as a proxy server, connected to network 26 that manages access to network 30 by performing an HTTP authentication to authenticate devices prior to granting access to network 30. As one example, network configuration module 18 may automatically open a web browser that is directed to a website provided by authentication device 28, and may automatically populate an HTTP authentication form of the website using authentication information 14 received in one or more short range wireless communications 8. Computing device 16 may submit the authentication information to authentication device 28 using network interface 22. In some examples, authentication device 28 may be connected to access device 24 (e.g., a network router), and computing device 16 may submit the authentication information to authentication device 28 using access device 24.

Authentication device 28 may authenticate computing device 16 based on the authentication information submitted by computing device 16. Upon successful authentication, computing device 16 may access network 30 using network 26. Examples, of network 30 may include a wide area network (WAN) such as the Internet, a telephone network such as a cellular telephone network, an enterprise network, or one or more other types of networks.

In certain examples, authentication device 28 and access device 24 may be formed in a common hardware unit (e.g., a server or other network device such as a router or switch). In some examples, authentication device 28 and access device 24 may comprise software and/or firmware units that are executed on or operable by one or more processors of a common hardware unit. As such, the authentication mechanism ascribed to authentication device 28 may, in some examples, be included within access device 24. For instance, computing device 16 may be connected to network 26 via access device 24. Computing device 16 may submit the authentication information to access device 24 using network interface 22. In such an example, access device 24 may authenticate computing device 16 based on the authentication information submitted by computing device 16, and may enable computing device 16 to access network 30 using network 26. In another example, access device 24 may determine that computing device 16 is not authenticated based on the authentication information submitted by computing device 16. As such, access device 24 may disallow computing device 16 from accessing network 30. Access device 24 may continue to enable computing device 16 to access network 26 while disallowing computing device 16 from accessing network 30.

As seen in the illustrated example of FIG. 1, techniques of this disclosure may simplify the process required for a computing device to gain authorized access to the Internet. For instance, as in the example of FIG. 1, the techniques may allow a computing device to receive configuration information for a LAN and authentication information for a WAN using short range wireless communications received from another device (e.g., one or more communications using a short range wireless communication protocol). The computing device may use the received configuration information to automatically configure the computing device to connect to the LAN. Further, the computing device may automatically submit the received authentication information to an authentication device that manages access to the WAN. After successful authentication, the computing device may automatically connect to the WAN. As such, the techniques may eliminate or reduce the number of steps typically required of a user to connect to a WAN, such as the Internet, through a LAN, such as a publicly available WLAN provided by a store or other hotspot provider.

Figure 2:
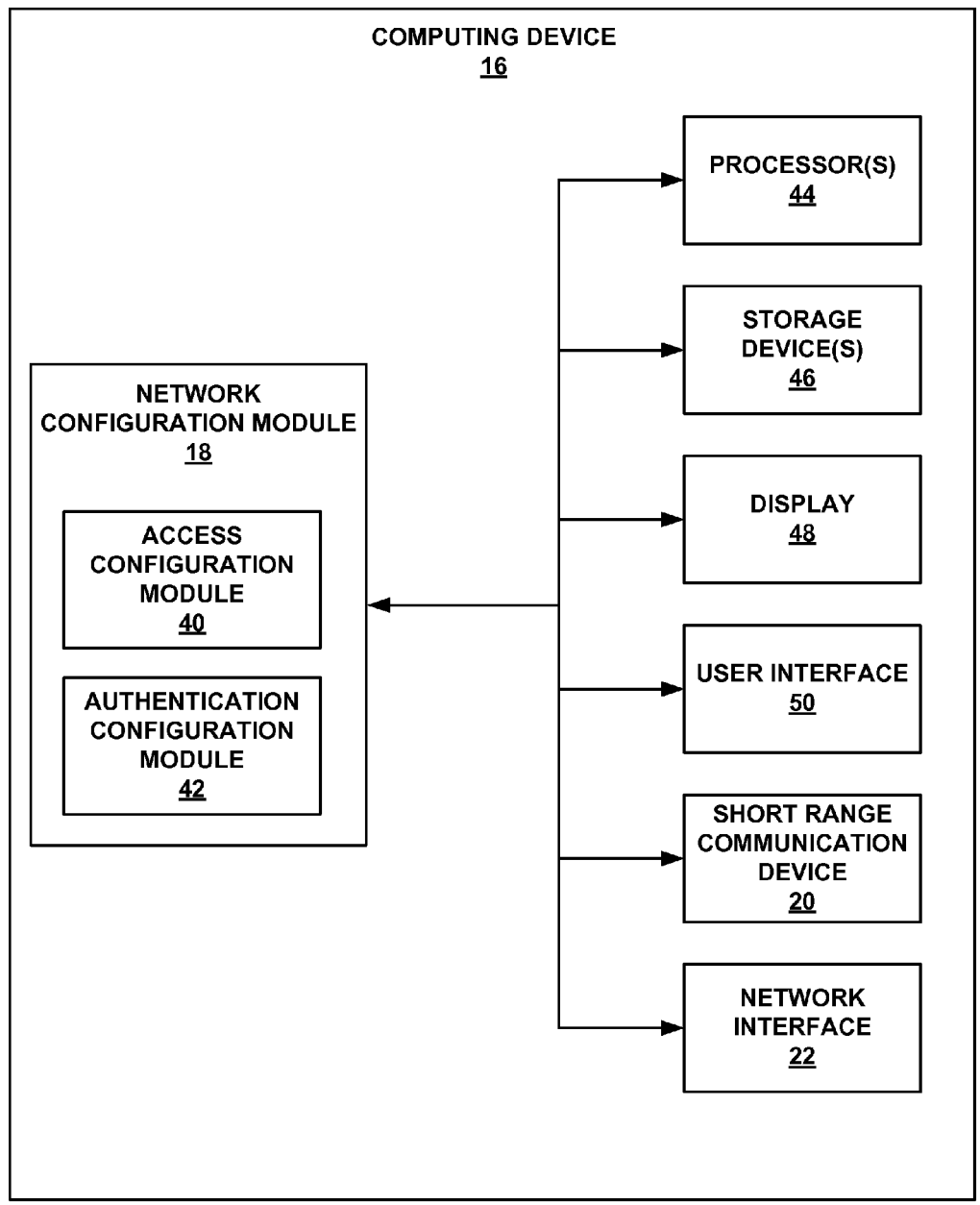
FIG. 2 is a block diagram illustrating an example computing device, in accordance with one or more aspects of this disclosure.

FIG. 2 is a block diagram illustrating an example computing device, in accordance with one or more aspects of this disclosure. As illustrated in FIG. 2, computing device 16 may include network configuration module 18, one or more processors 44, one or more storage devices 46, display 48, user interface 50, short range communication device 20, and network interface 22. Network configuration module 18 may include access configuration module 40 and authentication configuration module 42.

Computing device 16 may include additional components not shown in FIG. 2 for clarity. For example, computing device 16 may include a battery to provide power to the components of computing device 16. Similarly, the components of computing device 16 shown in FIG. 2 may not be necessary in every example of computing device 16. For instance, if computing device 16 comprises a portable media player such as a music player, computing device 16 may not include display 48.

Although shown as separate components in FIG. 2, in some examples, one or more of access configuration module 40 and authentication configuration module 42 may be part of the same module. In some examples, one or more of access configuration module 40, authentication configuration module 42, and one or more processors 44 may be formed in a common hardware unit. In certain examples, one or more of access configuration module 40 and authentication configuration module 42 may be software and/or firmware units that are executed on or operable by one or more processors 44.

One or more processors 44 may include, in certain examples, any one or more of a microprocessor, a controller, a digital signal processor (DSP), an application specific integrated circuit (ASIC), a field-programmable gate array (FPGA), or equivalent discrete or integrated logic circuitry. In some examples, one or more storage devices 46 may store one or more instructions that cause one or more processors 44 and modules 40 and 42 to perform various functions ascribed to one or more processors 44 and modules 40 and 42.

One or more storage devices 46 may include any form of machine- or computer-readable media. For example, one or more storage devices 46 may include any volatile, non-volatile, magnetic, optical, or electrical media, such as a hard drive, random access memory (RAM), read-only memory (ROM), non-volatile RAM (NVRAM), electrically-erasable programmable ROM (EEPROM), flash memory, or any other digital media.

One or more storage devices 46 may, in some examples, be considered as a non-transitory storage medium. In certain examples, the one or more storage devices 46 may be considered as a tangible storage medium. The terms "non-transitory" and "tangible" may indicate that the storage medium is not embodied in a carrier wave or a propagated signal. However, the term "non-transitory" should not be interpreted to mean that one or more storage devices 46 are non-movable. As one example, one or more storage devices 46 may be removed from computing device 16, and moved to another device. As another example, one or more storage devices, substantially similar to one or more storage devices 46, may be inserted into computing device 16. In certain examples, a non-transitory storage medium may store data that can, over time, change (e.g., in RAM).

Display 48 may be a liquid crystal display (LCD), e-ink, organic light emitting diode (OLED), or other display. Display 48 may present the content of computing device 16 to a user. For example, display 48 may present a web browser, or other functions that may need to be presented to a user. In some examples, display 48 may be a touch screen that can allow a user to interact with the computing device 16.

User interface 50 may allow a user of computing device 16 to interact with computing device 16. Examples of user interface 50 may include, but are not limited to, a keypad embedded on the computing device 16, a keyboard, a mouse, a roller ball, buttons, a touch screen, or other devices that allow a user to interact with computing device 16. In some examples, display 48 may present some or all of the functionality of user interface 50. For instance, display 48 may be a touch screen that can allow a user to interact with computing device 16.

Computing device 16 may send and receive one or more wireless communications using short range communication device 20. Examples of short range communication device 20 may include, but are not limited to, Bluetooth® transceivers, RFID tags, RFID readers, IrDA transceivers, passive NFC hardware such as passive NFC tags, and active NFC hardware. In some examples, computing device 16 may initiate short range wireless communications with a remote device (e.g., device 4 of FIG. 1) using short range communication device 20. For example, short range communication device 20 may comprise active NFC hardware. Computing device 16 may initiate short range wireless communications with passive NFC hardware of a remote device by actively generating a radio frequency (RF) field that powers the passive NFC hardware of the remote device to generate or modulate an RF field including one or more communications that may be received by short range communication device 20. Similarly, short range communication device 20 may initiate communications with active NFC hardware of a remote device that is configured to emulate passive NFC hardware. For instance, the active NFC hardware of the remote device may be configured to emulate a passive NFC tag. Upon receiving an RF field actively generated by short range communication device 20, the active NFC hardware of the remote device configured to emulate the passive NFC tag may send one or more communications that may be received by short range communication device 20.

In some examples, short range communication device 20 may include active NFC hardware, and may send and receive one or more communications with active NFC hardware of a remote device using peer-to-peer communications. For example, short range communication device 20 may actively generate an RF field that may cause one or more communications to be received by active NFC hardware of a remote device. Similarly, the active NFC hardware of the remote device may actively generate an RF field that may cause one or more communications to be received by short range communication device 20. As one example, the peer-to-peer communications may be initiated by short range communication device 20. For instance, a user of computing device 16 may bring computing device 16 within the effective physical range of near field communication (e.g., approximately 4 centimeters), and short range communication device 20 may initiate peer-to-peer communications by actively generating an RF field including one or more short range wireless communications that are received by the active NFC hardware of the remote device. As another example, the peer-to-peer communications may be initiated by the remote device. For instance, a user of computing device 16 may bring computing device 16 within the effective physical range of near field communications, and short range communication device 20 may receive one or more communications from an RF field actively generated by the NFC hardware of the remote device.

In certain examples, short range communication device 20 may include a Bluetooth® transceiver. In such examples, short range communication device 20 may send and receive short range wireless communications with a Bluetooth® transceiver of a remote device using a Bluetooth® communication protocol. For instance, when short range communication device 20 includes a Bluetooth® transceiver, short range communication device 20 may be configured as a slave to a Bluetooth® transceiver of the remote device. As such, short range communication device 20 may receive one or more short range wireless communications from the Bluetooth® transceiver of the remote device.

In some examples, short range communication device 20 may include an RFID reader, and may receive one or more short range wireless communications from an RFID tag. For instance, short range communication device 20 may actively generate an RF field that powers a passive RFID tag to generate an RF field or module the RF field generated by short range communication device 20. The RF field generated or modulated by the RFID tag of the remote device may include one or more RFID communications that may be received by short range communication device 20.

In certain examples, short range communication device 20 may include an IrDA transceiver that may send and receive short range wireless communications with an IrDA transceiver of a remote device using pulses of infrared light. For example, short range communication device 20 may initiate short range wireless communications with an IrDA transceiver of a remote device by sending optical communications to the IrDA transceiver of the remote device, such as by using the Infrared Communications Protocol (IrCOMM). Short range communication device 20 may receive short range wireless communications from the IrDA transceiver of the remote device in response to the initiated communications by short range communication device 20. Similarly, in some examples, the IrDA transceiver of the remote device may initiate short range wireless communications, such as by sending IrDA communications using IrCOMM that received by short range communication device 20.

Computing device 16 may receive one or more short range wireless communications from a remote device (e.g., device 4) that include configuration information 12 for connecting to a LAN, and authentication information 14 for authentication of computing device 16 by authentication device 28 (e.g., a proxy server), that manages access to a WAN, such as the Internet. Access configuration module 40 may configure computing device 16 to connect to the LAN (e.g., network 26)

using configuration information 12. For example, configuration information 12 may include a service set identifier (SSID) that identifies the LAN. Access configuration module 20 may configure network interface 22 to connect to the LAN using the SSID included in configuration information 12. In certain examples, configuration information 12 may include both an SSID and a password for the LAN. For instance, the LAN may be an encrypted LAN. As such, access device 24 may require a password from a device before granting access to network 26. In such an example, access configuration module 20 may configure network interface 22 to connect to the LAN using both the SSID and the password included in configuration information 12.

Authentication configuration module 42 may use authentication information 14 received in the one or more short range communications to configure computing device 16 for authentication by authentication device 28. For example, authentication device 28 may manage access to network 30 (e.g., the Internet) using an HTTP authentication mechanism that includes the submission of a username and password by devices requesting authentication. For instance, authentication device 28 may use HTTP basic access authentication (unencrypted authentication) or HTTP digest access authentication (encrypted authentication) to authenticate devices prior to granting access to network 30. As one example, authentication configuration module 42 may automatically launch a web browser which is directed to a website provided by authentication device 28. The website may provide an authentication form requesting authentication information. Authentication configuration module 42 may automatically populate the authentication form using authentication information 14, and may submit the authentication information to authentication device 28 using the completed authentication form.

As another example, authentication configuration module 42 configure network interface 22 to prepend a request made to authorization device 28 for a website with authentication information using authentication information 14. For instance, authentication device 28 may use HTTP basic access authentication to authenticate devices prior to granting access to network 30. In such an example, authentication device 28 may prepend a request for a website with the user name and password using the HTTP basic access authentication protocol.

In some examples, authentication information 14 may comprise single-use authentication information. For instance, a user may purchase network access time, such as from a commercial hotspot provider or other fee-based network access provider. The second device (e.g., device 4) may generate a username or password that allows access to network 26 (and therefore network 30) for only a specified amount of time. As one example, device 4 may be connected to network 26. Device 4 may configure one or more of access device 24 or authentication device 28 to accept the single-use username or password for only a specified time limit. In another example, one or more of access device 24 or authentication device 28 may provide a single-use username or password to device 4 that allows access to network 26 or network 30 for only a specified amount of time. The specified amount of time may correspond to an amount of network access time purchased by the user. Upon expiration of the specified time limit, one or more of access device 24 or authentication device 28 may deny access to a device using the expired username or password.

Upon successful authentication by authentication device 28, authentication configuration module 42 may configure network interface 22 to access network 30 (e.g., the Internet) using network 26 (e.g., a WLAN). As such, techniques of this disclosure may simplify the process of connecting a computing device to a WAN, such as the Internet, by reducing the amount of interaction with a computing device that is typically required of a user.

Figure 3:
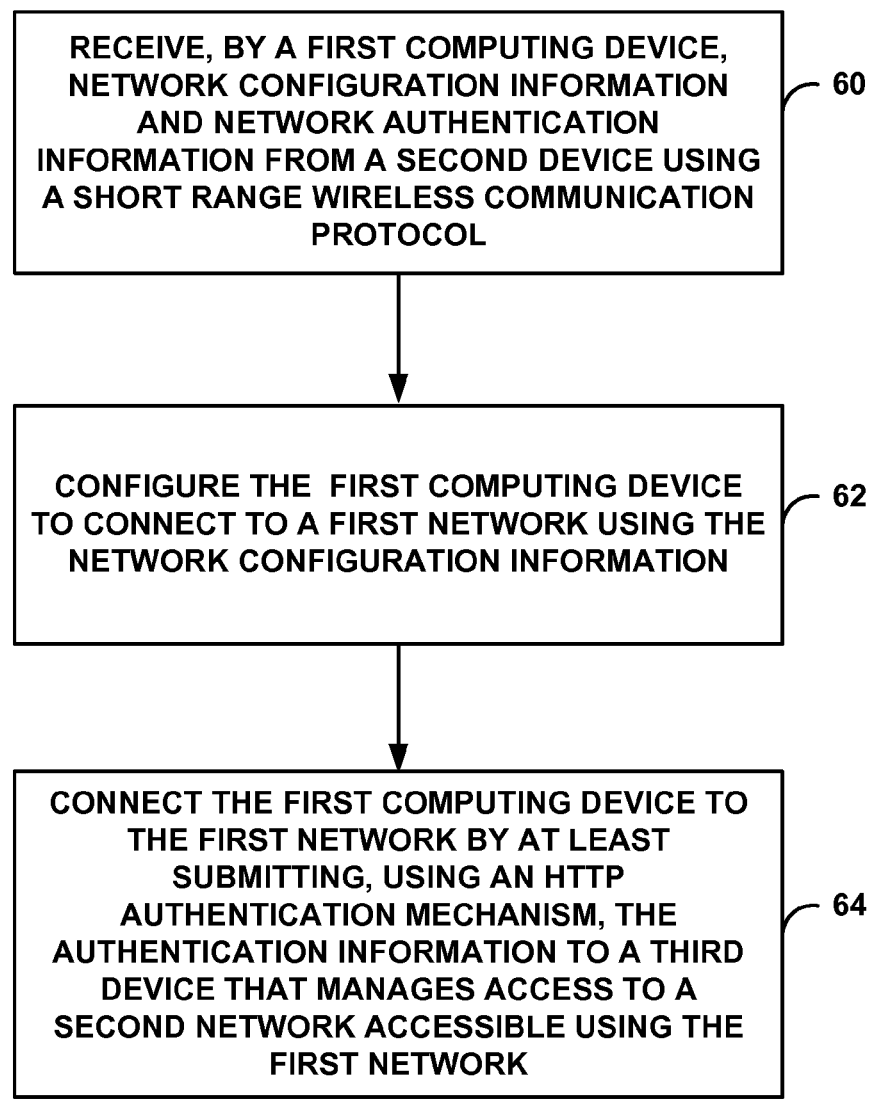
FIG. 3 is a flow diagram illustrating an example operation of a computing device for configuring the computing device to connect to a first network and submitting authentication information to access a second network, in accordance with one or more aspects of this disclosure.

FIG. 3 is a flow diagram illustrating an example operation of a computing device for configuring the computing device to connect to a first network and submitting authentication information to access a second network, in accordance with one or more aspects of this disclosure. For purposes of illustration only, the example operation is described below within the context of communication system 2 of FIG. 1 and computing device 16 of FIG. 2.

Computing device 16 may receive one or more communications from a second device (e.g., device 4) using a short range wireless communication protocol, wherein the one or more communications include network configuration information and network authentication information (60). As one example, the one or more communications may include one or more near field communications that include the network configuration information and network authentication information. Computing device 16 may initiate the one or more communications using active NFC hardware (e.g., short range communication device 20). Computing device 16 may receive one or more communications from passive NFC hardware of the second device, from active NFC hardware of the second device configured to emulate passive NFC hardware, or from active NFC hardware of the second device using peer-to-peer communications. In some examples, the second device may initiate the one or more communications, such as by initiating one or more peer-to-peer communications with active NFC hardware of computing device 16 (e.g., short range communication device 20).

The one or more communications that include network configuration information (e.g., configuration information 10) may include a service set identifier (SSID). In some examples, such as when the network is an encrypted network, the network configuration information may include a password. The one or more communications that include network authentication information (e.g., authentication information 14) may include a username and password that, when provided to a third computing device (e.g., authentication device 28) that manages access to a second network (e.g., the Internet), successfully authenticates the first computing device. In certain examples, one or more of the configuration information or authentication information may be single-use configuration information or single-use authentication information. One or more of the single-use configuration information or single-use authentication information may correspond to an amount of network access time associated with the single-use information (e.g., the amount of time purchased by a user).

Access configuration module 40 may configure computing device 16 to connect to a first network (e.g., network 26) using the network configuration information (62). For example, the configuration information (e.g., configuration information 12) may include an SSID that identifies the first network. Access configuration module 40 may configure network interface 22 to connect to the first network using the SSID included in the configuration information. In some examples, such as when the first network is an encrypted network, the network configuration information may include an SSID and a password. In such examples, access configuration module 40 may configure network interface 22 to connect to the first network using the SSID and the password included in the configuration information.

Authentication configuration module 42 may configure network interface 22 to automatically connect computing device 16 to the first network (e.g., network 26) by at least submitting, using an HTTP authentication mechanism, the authentication information to a third device (e.g., authentication device 28) that manages access to a second network (e.g., network 30) accessible using the first network (e.g., network 26) (64). For example, the authentication information (e.g., authentication information 14) may include a username and password. Authentication configuration module 42 may configure network interface 22 to automatically submit the username and password using HTTP basic access authentication (unencrypted examples), HTTP digest access authentication (encrypted examples), or one or more other HTTP authentication mechanisms. In some examples, the authentication information may be single-use authentication. The single-use authentication may correspond to an amount of network access time associated with the single-use authentication, such as an amount of network access time purchased by a user of a fee-based network access provider.

Figure 4:
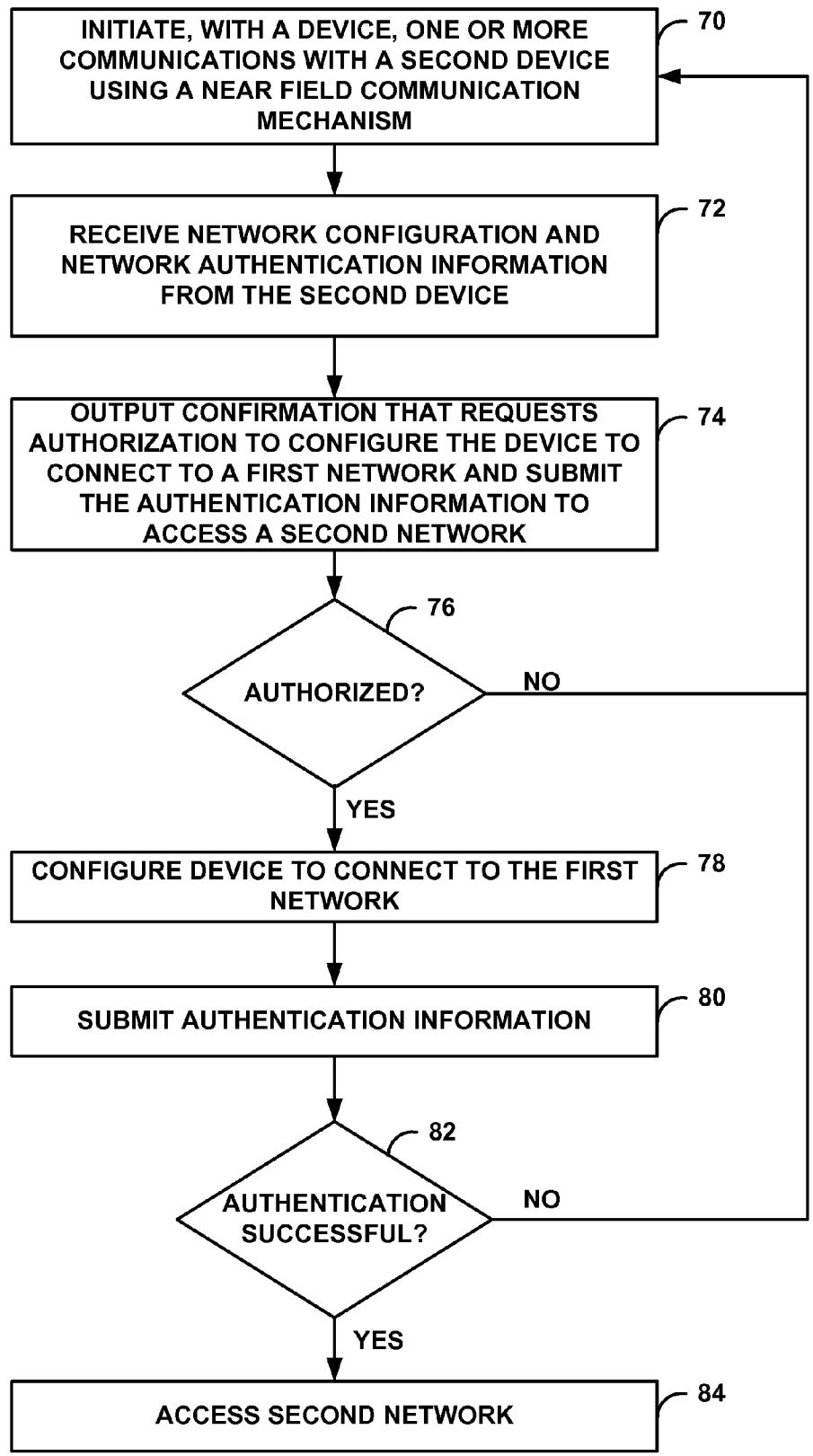
FIG. 4 is a flow diagram illustrating an example operation of a computing device for configuring the computing device to connect to a first network and submitting authentication information to access a second network, in accordance with one or more aspects of this disclosure.

FIG. 4 is a flow diagram illustrating an example operation of a computing device for configuring the computing device to connect to a first network and submitting authentication information to access a second network, in accordance with one or more aspects of this disclosure. For purposes of illustration only, the example operation is described below within the context of communication system 2 of FIG. 1 and computing device 16 of FIG. 2. Computing device 16 may initiate one or more communications (e.g., using short range communication device 20) with a second device (e.g., device 4) (70) using a near field communication protocol. For example, short range communication device 20 may include active NFC hardware. Short range communication device 20 may initiate one or more communications with passive NFC hardware of device 4, with active NFC hardware of device 4 configured to emulate passive NFC hardware (e.g., a passive NFC tag), or with active NFC hardware of device 4 using peer-to-peer communications.

Short range communication device 20 may receive one or more communications (e.g., one or more communications using an NFC mechanism) from device 4 that include network configuration information and network authentication information (72). As one example, short range communication device 20 may receive one short range wireless communication from device 4 that includes both the network configuration information and the network authentication information. As another example, short range communication device 20 may receive the network configuration information and network authentication information across multiple communications (e.g., multiple communications using an NFC communication protocol) from device 4. For instance, short range communication device 20 may receive the network configuration information in one communication and may receive the network authentication information in another communication. The network configuration information may include an SSID or, in the case that the network is an encrypted network, an SSID and a password. The authentication information may include a username and password that, when submitted to a third device (e.g., authentication device 28) that manages access to a second network (e.g., network 30), successfully authenticates computing device 16.

Network configuration module 18 may output a confirmation request that requests authorization to configure the first computing device to connect to the first network (e.g., network 26) and submit the authentication information to access the second network (e.g., network 30). For example, to prevent computing device 16 from inadvertently connecting to a LAN or the Internet, network configuration module 18 may output a confirmation request that requests authorization from a user to proceed with the network configuration and authorization. As one example, network configuration module 18 may output a message using display 18 that requests authorization to proceed. For instance, network configuration module 18 may provide a confirmation request using display 18 that requests the user to provide an authorization command by selecting whether the device is authorized to connect to the first network (a LAN) and submit authentication information to connect to the second network (e.g., the Internet), or whether the device is not authorized to proceed with the network configuration. As another example, network configuration module 18 may use one or more speakers of computing device 16 (not illustrated) to provide the confirmation request as an audio message. For instance, network configuration module 18 may output the audio message "press or say 1 to authorize newly detected network connection, press or say 2 to deny authorization."

The authorization command may be verbal (e.g., using one or more microphones of computing device 16 that are not illustrated), may utilize a button press using user interface 50, or both. Computing device 16 may receive the authorization command, and network configuration module 18 may determine whether the device is authorized to connect to the first network (e.g., network 26) and submit the authentication information for access to the second network (e.g., network 30) (76). If network configuration module 18 determines that computing device 16 is not authorized to proceed with the network configuration ("NO" branch of 76), computing device 16 may attempt to initiate one or more communications with another device using a near field communication protocol.

If, however, network configuration module 18 determines that computing device 16 is authorized to proceed with the network configuration ("YES" branch of 76), access configuration module 40 may, in response to the received authorization command, configure network interface 22 to connect to the first network using the network configuration information received in the one or more short range wireless communications from device 4 (78). For instance, access configuration module 40 may configure network interface 22 to connect to the first network using an SSID included in the configuration information, or using an SSID and password included in the configuration information (e.g., in examples where the network is an encrypted network).

Authentication configuration module 42 may configure network interface 22 to submit authentication information to authentication device 28 using the authentication information included in the one or more short range wireless communications received from device 4. For example, authentication configuration module 42 may configure network interface 22 to automatically submit the authentication information using HTTP basic access authentication, HTTP digest access authentication, or one or more other HTTP authentication mechanisms. If the authentication is not successful ("NO" branch of 82), computing device 16 may attempt to initiate communications with another device using a near field communication protocol. If, however, computing device 16 is successfully authenticated by authentication device 28 ("YES" branch of 82), network configuration module 18 may configure network interface 22 to access the second network (e.g., network 30) using the first network (e.g., network 26) (84).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A method comprising:
   receiving, by a first computing device, one or more communications from a second device, wherein the one or more communications are transmitted using a short range wireless communication protocol, and wherein the one or more communications include network configuration information usable to connect the first computing device to a first network and network authentication information;
   configuring the first computing device to connect to the first network using the network configuration information; and
   automatically connecting the first computing device to the first network by at least submitting, by the first computing device using a hypertext transfer protocol (HTTP) authentication mechanism, the authentication information to a third computing device that manages access to a second network accessible by the first network, wherein automatically connecting the first computing device to the first network by at least submitting the authentication information to the third computing device comprises:
   responsive to configuring the first computing device to connect to the first network, automatically launching a web browser of the first computing device to connect to the first network, wherein the web browser provides an HTTP authentication form; and
   automatically populating, with the first computing device, the HTTP authentication form using the authentication information.

2. The method of claim 1, further comprising accessing, with the first computing device, the second network through the first network upon successfully authenticating the first computing device.

3. The method of claim 1, further comprising outputting, by the first computing device, a confirmation request that requests permission from a user to permit the configuration of the first computing device to connect to the first network and submit the authentication information.

4. The method of claim 1, further comprising:
   receiving, with the first computing device, an authorization command; and
   responsive to receiving the authorization command, submitting, by the first computing device, the authentication information to the third computing device.

5. The method of claim 1, wherein the short range wireless communication protocol comprises near field communication (NFC).

6. The method of claim 5,
   wherein receiving the one or more communications comprises receiving the one or more communications with an active near field communication (NFC) hardware of the first computing device from an active NFC hardware of the second device configured to emulate passive NFC hardware, and
   wherein the method further comprises initiating, with the first computing device, the receiving of the one or more communications using the active NFC hardware of the first computing device.

7. The method of claim 5,
   wherein receiving the one or more communications comprises receiving the one or more communications with an active near field communication (NFC) hardware of the first computing device from an active NFC hardware of the second device, and
   wherein the method further comprises initiating, with the first computing device using the active NFC hardware of the first computing device, the receiving of the one or more communications using peer-to-peer communication.

8. The method of claim 1,
   wherein receiving the one or more communications comprises receiving the one or more communications with an active near field communication (NFC) hardware of the first computing device from a passive NFC hardware of the second device, and
   wherein the method further comprises initiating, with the first computing device, the receiving of the one or more communications using the active NFC hardware of the first computing device.

9. The method of claim 6, wherein the passive NFC hardware of the second device comprises a passive NFC tag.

10. The method of claim 1, wherein the network configuration information includes a service set identifier (SSID) and a password.

11. The method of claim 10, wherein the network configuration information includes a password.

12. The method of claim 1, wherein the network authentication information includes a username and a password.

13. The method of claim 12, wherein automatically connecting the first computing device to the first network by at least submitting the authentication information to the third computing device comprises submitting, by the first computing device to the third computing device, the username and the password to cause the third computing device to permit the first computing device to access the second network.

14. The method of claim 1, wherein the first network comprises a wireless local area network, and wherein the second network comprises a wide area network.

15. The method of claim 1, wherein the authentication information comprises single-use authentication information.

16. The method of claim 15, wherein the single-use authentication information corresponds to an amount of time the first computing device is permitted to access the second network.

17. A computer-readable storage device comprising instructions that, if executed, cause one or more processors of a first computing device to perform operations comprising:
receiving one or more communications from a second device, wherein the one or more communications are transmitted using a short range wireless communication protocol, and wherein the one or more communications include network configuration information usable to connect the first computing device to a first network and network authentication information;
configuring the first computing device to connect to the first network using the network configuration information; and
automatically connecting the first computing device to the first network by at least submitting, using a hypertext transfer protocol (HTTP) authentication mechanism, the authentication information to a third computing device that manages access to a second network accessible by the first network, wherein automatically connecting the first computing device to the first network by at least submitting the authentication information to the third computing device comprises:
responsive to configuring the first computing device to connect to the first network, automatically launching a web browser of the first computing device to connect to the first network, wherein the web browser provides an HTTP authentication form; and
automatically populating, with the first computing device, the HTTP authentication form using the authentication information.

18. A computing device, comprising:
at least one processor;
an interface configured to receive one or more communications from a second device, wherein the one or more communications are transmitted using a short range wireless communication protocol, and wherein the one or more communications include network configuration information usable to connect the computing device to a first network and network authentication information; and
a network configuration module operable by the at least one processor to configure the computing device to automatically connect to the first network using the network configuration information by at least submitting, using a hypertext transfer protocol (HTTP) authentication mechanism, the authentication information to a third computing device that manages access to a second network accessible by the first network, wherein configuring the computing device to automatically connect the computing device to the first network by at least submitting the authentication information to the third computing device comprises:
configuring the computing device to automatically launch a web browser to connect to the first network, wherein the web browser provides an HTTP authentication form; and
configuring the computing device to automatically populate the HTTP authentication form using the authentication information.

* * * * *